Feb. 20, 1962  W. J. READING  3,022,004
EGG COUNTERS
Filed Oct. 5, 1956  5 Sheets-Sheet 2

FIG. 4.

INVENTOR.
WALTER J. READING
BY
Beau, Brooks, Buckley & Beau
ATTORNEYS

Feb. 20, 1962 W. J. READING 3,022,004
EGG COUNTERS
Filed Oct. 5, 1956 5 Sheets-Sheet 5

INVENTOR.
WALTER J. READING
BY
Bean, Brooks, Buckley & Bean
ATTORNEYS

United States Patent Office 3,022,004
Patented Feb. 20, 1962

3,022,004
EGG COUNTERS
Walter J. Reading, Agency Road, R.R. 1, Ottumwa, Iowa
Filed Oct. 5, 1956, Ser. No. 614,291
11 Claims. (Cl. 235—98)

My invention relates in general to egg counting devices and in particular to a device which may be used by an egg merchant to count the number of eggs brought to him by several different farmers.

It is well known that it is difficult for the merchant to keep count of the eggs of each farmer, particularly when the end of one farmer's run of eggs occurs when a carton or flat is partially filled. To this end, the principal object of my invention has been to provide a device whereby each carton of one dozen or each flat of three dozen may be accurately counted, and whereby the eggs remaining in the end of one farmer's run which are of insufficient number to fill a carton or flat may be accurately recorded, as well as recording the number of eggs needed from the next farmer's run to complete the unfilled carton or flat.

Another object has been to provide a frame for holding egg cartons or flats while being filled which are provided with easily operated means for recording the number of eggs in unfilled cartons or flats.

A further object is to provide a counting device whereby two or more operators may fill separate cartons or flats at the same time from the same egg grader and discharge such egg containers at the same time.

A further object is to provide means whereby a cutoff may be made on a partially filled carton or flat after any number of eggs have been placed therein, whereby two or more farmers eggs may be placed in one flat or carton and each batch of eggs separately counted.

Another object has been to provide a device whereby an accurate count of eggs in a filled carton or flat may be registered no matter how fast the carton or flat is pushed off the assembly table.

Moreover, my invention contemplates the use of means whereby if the operator lingers in pushing off the filled container a double count of the eggs contained in the carton or flat will be prevented.

Furthermore, my device is so designed that if two cartons or flats of the same grade that are to be recorded on one totalizer are pushed off the table together, one will be counted and the accurate counting of the second will follow immediately.

Moreover, my invention reduces the cost of counting various grades of eggs and is simple and easy to operate.

The above objects and advantages have been accomplished by the device shown in the accompanying drawings; of which.

Figures 2, 3:
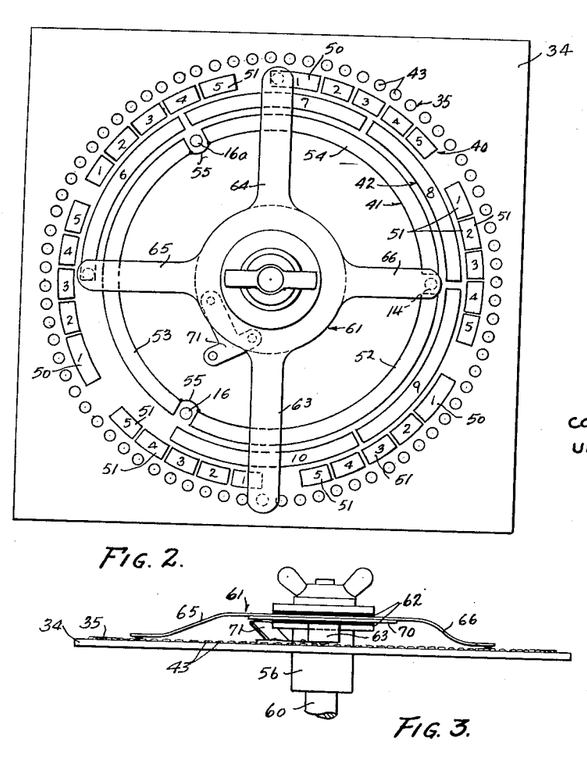
FIG. 2 is a plan view of the commutator plate thereof.
FIG. 3 is an end elevation of the commutator plate.
Figure 4:
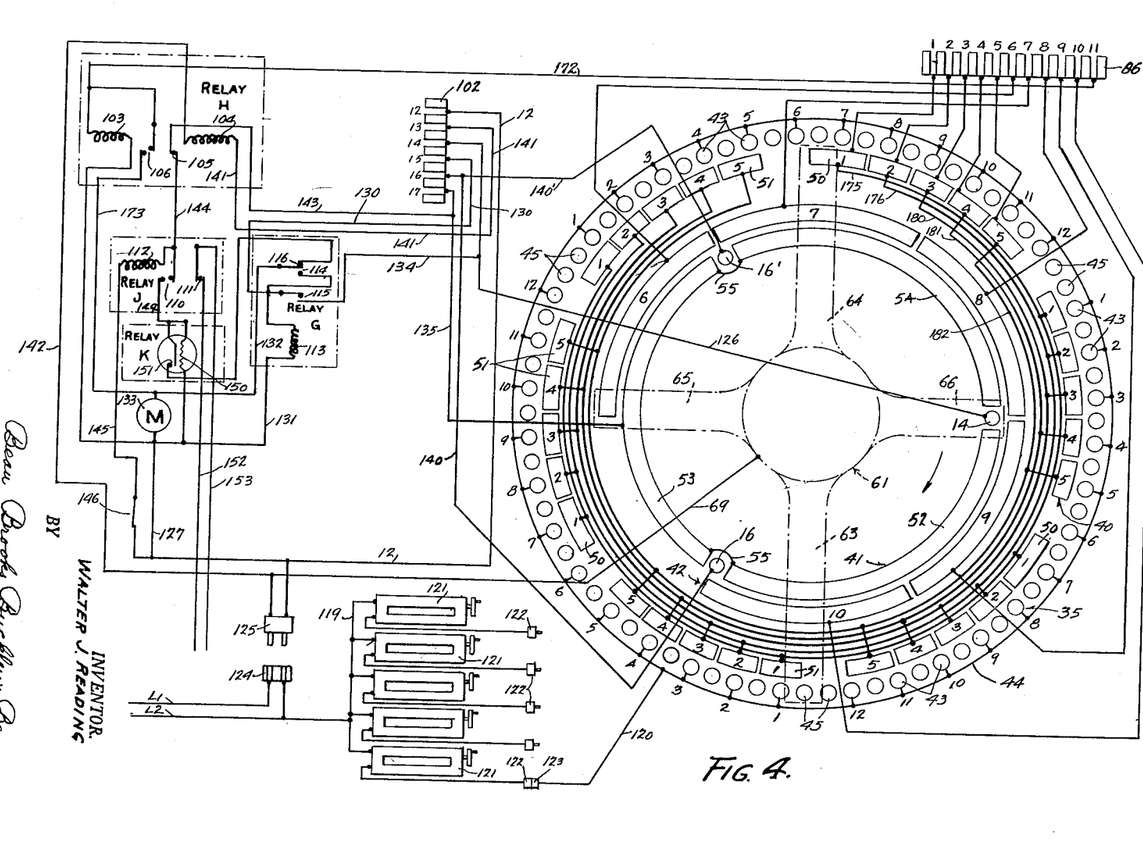
FIG. 4 is a somewhat diagrammatical representation of the commutator plate with the various contact members and circuits connected thereto.

Referring to the drawings, particularly FIGS. 2 and 4 thereof, the commutator unit of my device comprises a body 34 of sheet insulating material upon which the various stationary contact members are placed. These stationary contact members are arranged in four rows, an outer row 35 of contact members, an outer row 40 of frame segments, an inner row 41 of container segments, and an inner row 42 of frame segments arranged between the rows 40 and 41. The outer row comprises preferably a series of spaced contact buttons 43 equidistantly spaced and, as shown in FIG. 4 arranged in groups of twenty-four buttons each, alternate buttons being connected to a common counter lead 44, to be hereinafter described. Between each series of twenty-four buttons are arranged two dead rivets 45, to be hereinafter described. The outer row 40 of frame segments comprises a series of five segments 51 identified by Nos. 1, 2, 3, 4 and 5 and arranged in spaced relation with each other. As shown in FIG. 4 all No. 1 segments are connected together by means of a lead 175. Likewise, all Nos. 2, 3, 4 and 5 segments are connected together by means of leads 176, 180, 181 and 182, respectively. One set of segments 1, 2, 3, 4 and 5 are connected, respectively, with the recesses 1, 2, 3, 4 and 5 of the socket 86. The contact members 50 at the beginning of each of the alternate series being longer than the remaining segments of each of these series and longer than the segments 51 of the other alternate series, whereby the spider arm 66 will move off the dead-contact member 14, 16 or 16' and onto the segments 52, 53 and 54, respectively, without registering a count on the totalizer. The inner row 42 of frame segment contact members comprises five segments spaced apart from each other and extending around five-sixths of the circumference of the row, and identified as Nos. 6, 7, 8, 9 and 10. The inner row 41 of container segment contact members comprises three container segments 52, 53 and 54 of equal length and each extends substantially 120° around the circumference of the row but space is provided between the ends of each segment. These segments are joined together by means of two jumper wires 55, whereby the container segments 52—53 and 53—54 are electrically connected together. Arranged between the container segments 52 and 54 is a dead-contact member 14 and between the container segments 52 and 53, and 53 and 54 are located dead-contact members 16 and 16' respectively. The dead-contact members 14, 16 and 16' are connected together by suitable wiring shown in FIG. 4, to be described hereinafter.

Rotatably mounted at the center of the commutator plate 34 is a spider hub 56 which is mounted upon a motor shaft 60. The motor shaft extends to a motor of any standard type and, therefore, is not shown or described, the motor being indicated diagrammatically in FIG. 4 with the various circuit controls. Carried by the spider hub 56 is a spider or rotatable contact member 61 which is insulated from the hub by means of insulating washers 62. The spider is provided with a series of arms 63, 64, 65 and 66 which are engageable, respectively, with the rows of contacts 35, 40, 42 and 41. Arranged beneath the spider and secured thereto is a commutator washer 70 with which a contact plate 71 engages. The contact plate is connected to power line L1 by means of a lead 69, whereby all four arms of the spider will be energized.

Figure 6:
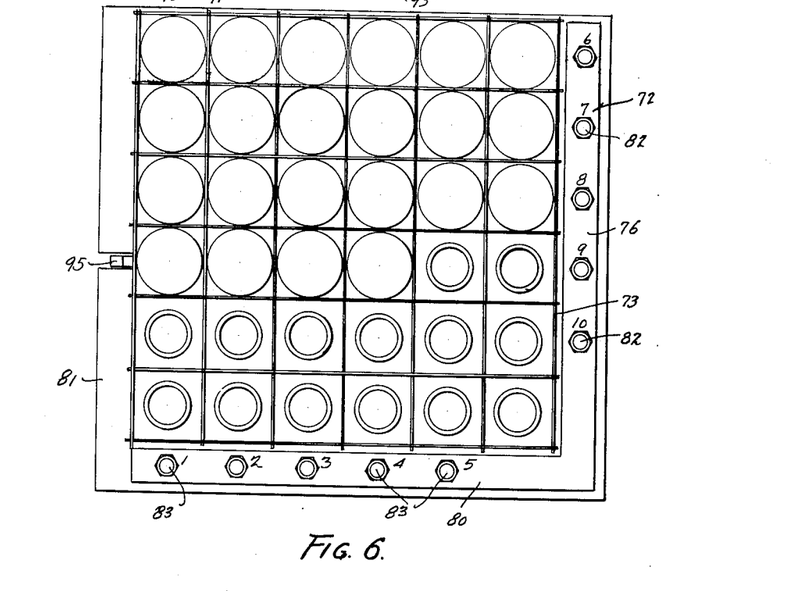
FIG. 6 is a similar view of a frame for a flat of eggs.

As a part of my invention, I provide two frames for holding egg containers. Since eggs are packed in three dozen flats or one dozen cartons, a frame 72 is provided for holding a flat 73 having thirty-six egg receptacles and a frame 74 is provided for holding a carton 75 having one dozen egg receptacles. Referring first to FIG. 6, the frame 72 there shown comprises a vertical leg 76 and a horizontal leg 80, arranged at right angles to each other and carried by a supporting plate 81 upon which the flat 73 rests while being filled with eggs. The vertical leg 76 is provided with five push button switches 82 spaced opposite each of the horizontal rows of egg receptacles except the last or lower row. Likewise, the horizontal leg 80 is provided with five push button switches 83, one arranged opposite each of the vertical rows of receptacles except the one at the right hand side of the frame. In like manner the frame for the cartons is formed with a vertical leg 90 and with a horizontal leg 91 carried by a supporting plate 79. Since but two horizontal rows of eggs fill a carton but one push button switch 92 is necessary in the vertical leg opposite the upper row of egg receptacles and five push button switches 93 are provided in the horizontal leg 91 and are located opposite each of the vertical rows of egg receptacles except the last vertical one to the right.

Figure 8:
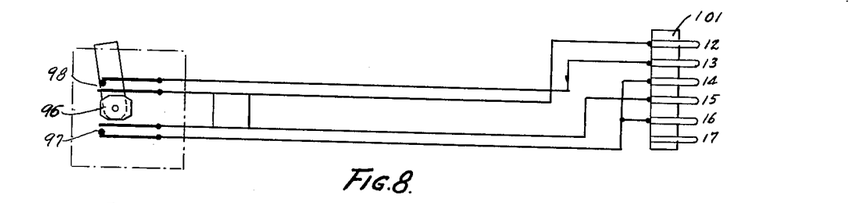
FIG. 8 is a diagrammatic representation of the pushoff switch of my device for use in connection with counting eggs when cartons are being filled.
Figure 9:
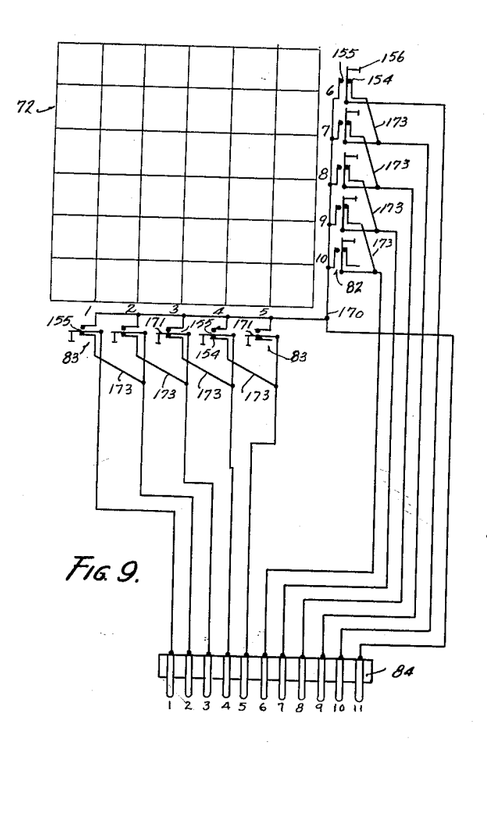
FIG. 9 is a diagrammatical represenation of the frame for holding flats.
Figure 10:
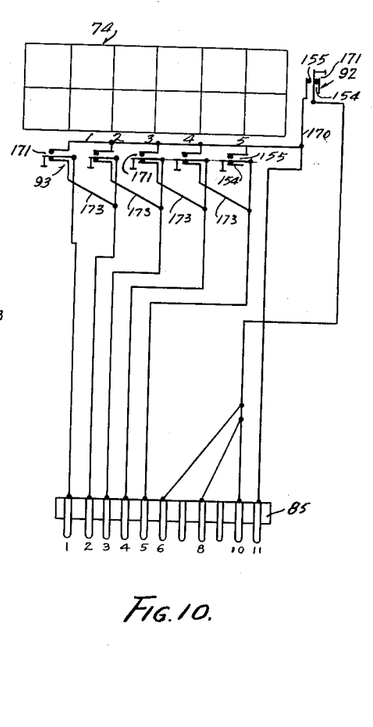
FIG. 10 is a similar representation of a frame for holding cartons.

Since my counter is to be interchangeably used with either flats or cartons, separate push-off switches must be provided. The leads from each of the switches in either the flats or cartons, as shown in FIGS. 9 and 10, are brought to plugs 84 and 85, respectively, for connection with a socket member 86 to which the corresponding leads of the commutator are connected, as will hereinafter be described. When a flat or carton has been filled with eggs it is removed from the supporting surface of the frame and thereby actuates a push-off switch 95 or 96, respectively, preferably carried by the supporting surfaces 81 or 79, respectively, of the frames. In removing of flat or carton which has been filled with eggs from the run of the same farmer, the total number of eggs is registered on the proper totalizer. Because of the fact that my device must be designed to handle flats and cartons, the push-off switches 95 and 96, respectively, are connected to leads extending from the four points thereof to suitable plugs 100 and 101, respectively (FIGS. 7 and 8), for connection to a socket member 102 to be hereinafter described.

Figure 1:
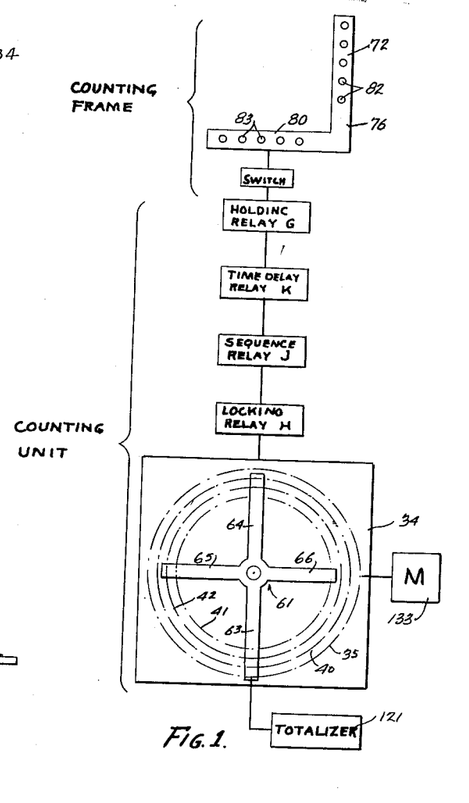
FIG. 1 is a diagrammatic view showing the various elements of my invention.

In carrying out my invention it is necessary that a number of relays be employed such as shown in FIGS. 1 and 4. The holding relay H is a locking relay and is used in circuits, to be hereinafter described, when flats or cartons are not completely filled by one farmer's eggs and this relay permits the number of eggs placed in the flat or carton to be registered on a totalizer before either flat or carton is filled with the next succeeding farmer's eggs. This relay comprises a locking coil 103 and an unlocking coil 104. A pair of normally closed contacts 105 and a pair of normally open contacts 106 are provided in this relay. A relay J which is in the nature of a sequence relay is also provided. This relay is used when two flats or cartons which are filled by two or more operators are discharged from the counting frames at the same time thereby assuring that one frame will be counted first before the other frame is counted. This relay, which is actuated by a coil 112, is provided with a pair of normally open contacts 110 and a pair of normally closed contacts 111.

Relay K is a time delay relay and is for the purpose of preventing one flat or carton from being counted twice if the operator lingers in pushing it off the supporting platform and thereby keeping either push-off switch 95 or 96 closed for too long a time. This relay is provided with a heater coil 150 which is energized when the contacts 110 of relay J are closed. The heated coil 150 will cause the contacts 151 of this relay to be closed after a certain time has elapsed after the initial operation of either switch 95 or 96. Relay G is a holding relay and is for the purpose of preventing the operator from pushing off the cartons too quickly and thus preventing the spider 61 from completing its cycle. This relay comprises a coil 113 and two pairs of normally open contacts 114 and 115. The relay is also provided with normally closed contacts 116.

Referring to FIG. 4, each series of twelve consecutive alternate contact buttons 43 is connected to the common counter lead 44. Since each of the buttons is spaced sufficiently to break the circuit as the arm 63 of the spider passes from one live button to the other, impulses are given to the counter lead which causes a corresponding number of impulses to be given the connected totalizer. Since the farmer is paid for the grade of eggs which he supplies to the packer, a totalizer 121 must be provided for each grade of eggs for each farmer and each of these totalizers is provided with a plug 122 which is connected to the socket 123 provided on the end of the totalizer lead 120. The other side of the totalizer circuits are connected to the line L2 by means of a branch lead 119. Since each of the totalizers is a standard article of manufacture designed to register a consecutive number each time it receives an electrical impulse, it will therefore not be described in detail.

In the practical embodiment of my invention, the commutator unit comprising the commutator plate with its stationary contact members, and the relays G, J, K and H are all enclosed within a casing, not shown for convenience of illustration. The current supplied to the device coming over lines L1 and L2 is connected to a socket member 124 which connects with a plug member 125 carried by the body of the commutator unit (not shown). Current is thereby supplied to the contact plate 71 and thence to the spider 61 and to the legs thereof. When the spider is in the position shown in FIGS. 2 and 4, current will, therefore, be supplied over lead 69 to the spider and by means of arm 66 to the dead-contact member 14. Dead-contact member 14 is connected by means of lead 126 to the recess 14 of the socket member 102 but current will not flow to the member 14 until the circuit is closed through suitable switch means, to be hereinafter described.

Figure 7:
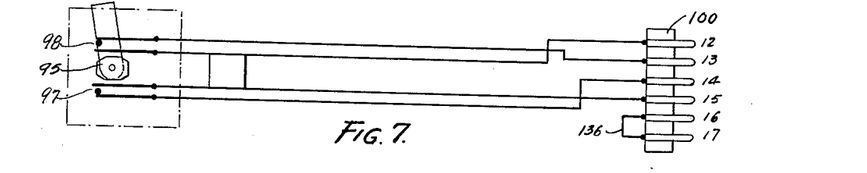
FIG. 7 is a diagrammatic representation of the push-off switch of my device for use in connection with counting flats of eggs.

Assuming now that flats of eggs are to be counted, the plug 100 of FIG. 7 together with its switch 95 will be connected to the socket member 102 and the recess 14 will thereby be connected to the corresponding pin 14, and pin 15 will engage recess 15. The switch 95 has two pairs of normally open switches 97 and 98 which are connected, respectively, to pins 14 and 15, and 12 and 13. Therefore, when the switch 95 is closed pins 14 and 15 will be connected together. Therefore, current will thereby be conducted over lead 130 to the coil 113 of relay G and thence over lead 131 to lead 127 connected with line L2. This will cause the contacts 115 and 114 of the relay to be closed, current thereby flowing from lead 130 through closed contacts 114 to lead 132 to the motor 133, returning to lead L2 through lead 127. Current will also flow from lead 130 through closed contact 115 of relay G to lead 134 which is connected to lead 126, thus maintaining current through coil 113 and holding the circuits closed until the spider has traveled off the dead-contact member 14. Just as soon as the arm 66, traveling in clockwise direction, leaves contact number 14, the current flowing through lead 126 is interrupted and the segments 52, 53, and 54 of the inner container row 41 will be energized. Current will then flow from these connected segments through lead 135 to recess 17 which will carry current to pin 17 of the plug 100. Pin 17 is connected to pin 16 of the plug by means of a jumper wire 136 carrying the current through recess 16 to leads 140 and 140' which are connected to the dead-contact members 16 and 16', respectively, thereby energizing these members, whereby the arm 63 of the spider will continue to operate around the complete 360° travel or until the arm 66 reaches and is brought into contact with the dead-contact member 14. During such travel thirty-six impulses will be given the connected totalizer by contact of the arm 63 with the energized buttons of the outer row 35 of thirty-six contact buttons.

Figure 12:
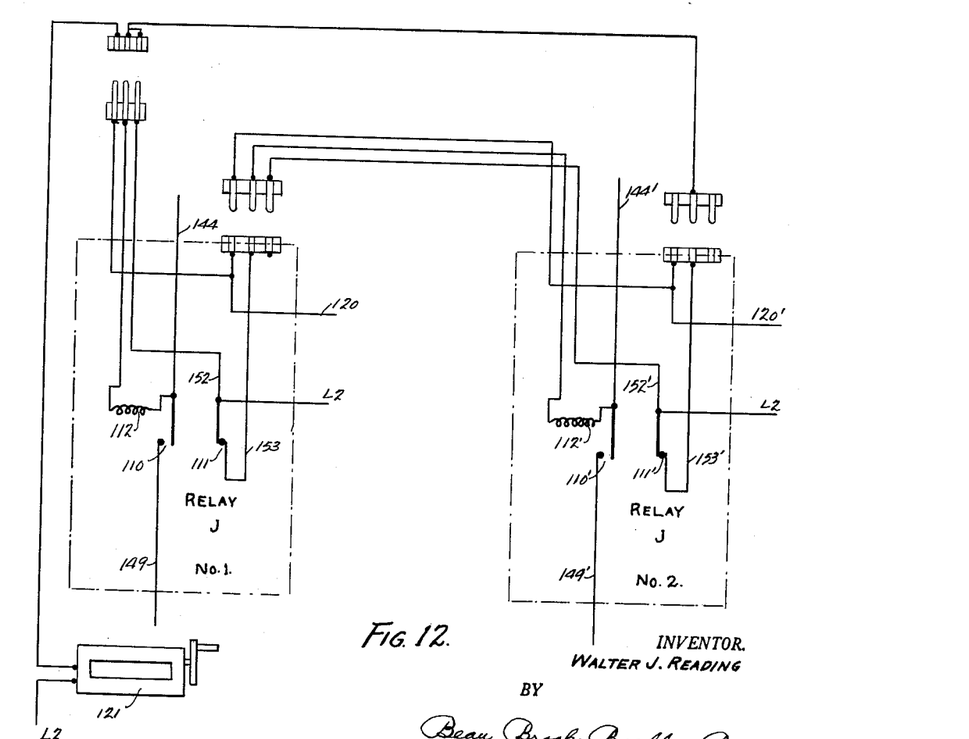
FIG. 12 is a diagrammatic view showing the connections between two relays of my invention when two frames are to be counted on one totalizer.

With the actuation of switch 95 contact points 98 will be closed thereby connecting pins 12 and 13 of plug 100 with each other and with the respective recesses 12 and 13 of the socket member 102. This will cause current from lead 12 to pass from recess 12 to recess 13 and thence over lead 141 to the unlocking coil 104 of relay H returning to the line L1 over lead 142. Since contacts 105 of relay H are normally closed they will not be disturbed by energization of the unlocking coil and current will flow through this pair of contacts from lead 135 over lead 143 through the closed contacts 105 and to the coil 112 of relay J over lead 144. From coil 112 current will flow over lead 145 back to L2 through a normally closed switch 146. Current will then flow through closed contacts 110 of relay J and to and through the heater 150 of the time delay relay K by means of lead 149. After the coil is heated by the passage of current therethrough, it will cause contacts 151 of this relay to be closed, whereby current will flow through closed contacts 116 of relay G and through lead 132 to the motor 133 causing the motor to be actuated as long as the arm 66 is on one of the container segments 52, 53 or 54, or until the arm has reached one of the dead-contact members 16—16' if eggs in cartons are being counted, or if eggs in flats are being counted, until the arm has passed completely around the connected segments just mentioned and has come to rest upon the dead-contact member 14 ready for another cycle. When contacts 110 of relay J are closed, contacts 111 are opened. These contacts are connected by means of leads 152 and 153 to a switch connected in series with a pair of contacts 111' of the relay J of a second counting unit (not shown) as illustrated in FIG. 12. Obviously, when cartons are being filled, the frame 74 will be used and it will be placed upon the supporting surface 79. Switch 96 will be connected by plug 101 to the socket member 102, and the actuation of the relays and the flow of current through the circuits will be substantially the same as those described in connection with the filling of a flat.

Figure 11:
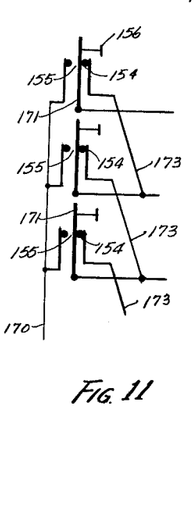
FIG. 11 is an enlarged view of a number of the frame switches.

As hereinbefore set forth, each of the frames 72 and 74 is provided with five push button switches 83 and 93, respectively, located on the horizontal leg and the vertical leg of the flats frame opposite each row except the lower one is provided with a push button switch 82. The vertical leg of the cartons frame is provided with but one push-button switch 92 opposite the top row. As shown in FIGS. 9, 10 and 11, each of these switches is a single pole double throw switch having a pair of normally closed contacts 154 and a pair of normally open contacts 155, the switch being operated by a push button 156. All the switches are energized by means of a common lead 170 extending from the open sides of the switches to the pin 11 of the plugs 84 and 85 of the flats and cartons, respectively. The normally closed side of each of the switch arm 171 of each of the switches 83 identified as 1, 2, 3, 4 and 5 in FIG. 9 is connected, respectively, to the pins 1, 2, 3, 4 and 5 of the plug 84. In like manner, the connecting arms 171 of the switches 82 identified by numbers 6, 7, 8, 9 and 10 are connected, respectively, to the pins 6, 7, 8, 9 and 10 of the plug 84. As shown in FIG. 9 the normally closed side of each switch is connected to the switch arm 171 of the next successive switch by means of a jumper wire 173 so that when switch 10 is depressed indicating that the horizontal rows of the flat or carton have been filled with six eggs each, the switches 6, 7, 8 and 9 will also be closed. It will be noted that pins 6, 7, 8, 9 and 10 of plug 84 are connected, respectively, to recesses 6, 7, 8, 9 and 10 of the socket 86 and the several recesses are connected, respectively, by means of suitable leads to the respective segments 6, 7, 8, 9 and 10 of the inner row 42 of frame segments. As shown in FIG. 6 when push-button switch 8 located opposite the last full horizontal row of eggs is pressed, push-button switches 6 and 7 will be energized and the spider arm 65 will pass over frame segments 6, 7 and 8 to register eighteen eggs. Assuming that the fourth row contains only four eggs push-button switch 4 of the horizontal row will be depressed which will also energize push-button switches 1, 2, 3 and 4. It will be noted that pins 1, 2, 3 and 4 of the plug 84 will be connected with recesses 1, 2, 3 and 4 of socket 86 and in turn will be connected by means of suitable leads to the respective frame segments 1, 2, 3 and 4 of outer row 40. When arm 65 passes off of the end of segment 8, arm 64 has contacted segment number 1 of the lower left-hand group in row 40 and the motor is kept operating until the arm passes over segments 1, 2, 3 and 4 thereby counting four eggs and coming to rest on 5 which is not energized, thereby registering a total of twenty-two eggs on the totalizer. Since this is the last of the first farmer's run the operator makes a note of the total registered on the proper totalizer, and then sets the totalizer back to zero. Under this procedure switch 95 has not been operated and when the next farmer's eggs are candled they are placed in the remaining fourteen receptacles of the flat container 73 which then fills the flat and when it is pushed off of its supporting surface the push-off switch 95 is actuated which will cause the spider to rotate until the arm 64 has passed off of segment 5; arm 65 has passed off of segments 9 and 10 of row 42 and the arm 66 has reached the first dead-contact member 14; thereby interrupting the rotation of the spider and recording the fourteen eggs which were used to completely fill the flat.

Figure 5:
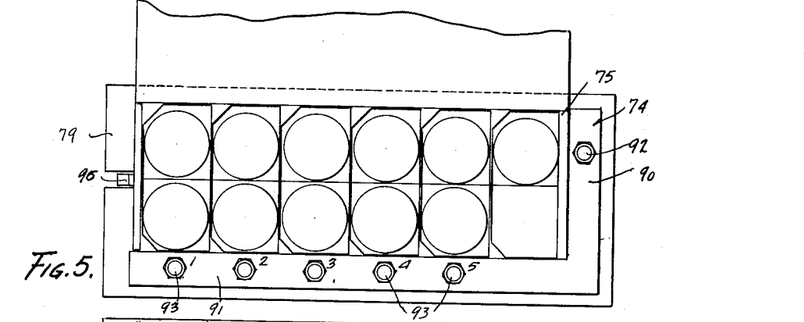
FIG. 5 is a plan view of a counter frame for a carton of eggs.

When cartons are to be filled with eggs, the flat plug is removed from the socket 86 and the carton plug 85 is attached thereto. As shown in FIG. 10, five push-button switches 93 are shown in horizontal arrangement and since there are only two horizontal rows of eggs only one switch 92 is shown in vertical leg of the frame. When using this frame I am assuming that the upper row has been completed as shown in FIG. 5 and that five eggs have been placed in the lower row, the switch 92 will be actuated which will connect pins 6, 8 and 10 of plug 85. Since the arm 65 of the spider is resting upon the common since there are only two horizontal rows of eggs only one switch 92 is shown in the vertical leg of the frame. When plug 85 is connected to socket 86 pins 1, 2, 3, 4 and 5 will be connected to the respective recesses 1, 2, 3, 4 and 5 of socket 86, which will cause the upper right-hand series of contact segments 1, 2, 3, 4 and 5 to be energized which will register five eggs on the totalizer, thus crediting the first farmer with eleven eggs. The carton will then be filled with a single egg from the next farmer's run and when pushed off the supporting surface, the single egg will be registered on the connected totalizer as the arm 66 rotates over the frame segment 52 of the row 41 of segments coming to rest upon the dead-contact member 16. The next time a carton is filled and pushed off the support, the arm 66 will be moved over segment 53 until the dead-contact member 16' is engaged, and the next dozen will move the contact arm over segment 54 until the dead-contact member 14 has been reached.

From the foregoing it will be obvious that when less than thirty-six eggs are to be totalized when flats are to be filled with eggs or when less than twelve eggs are to be totalized when cartons are to be filled with eggs, means must be provided for preventing the continued rotation of the spider. This is done through locking relay H. When the horizontal push-button switches 93 or 83 or vertically arranged push-button switches 92 or 82 on the counting frame are depressed to make partial count, the locking coil 103 is energized over common lead 170 of the frames through pin 11 of plug 84 or 85, recess 11 of receptacle 86 and lead 172, thereby closing contacts 106 of the relay and opening its contacts 105, current flowing directly to the motor M through contacts 106 and lead 173 and causing the spider to rotate the number of frame segments indicated by the push-button switches. The breaking of contacts 105 of this relay will deenergize frame segments 52, 53 and 54, the spider moving just far enough to count the number of eggs indicated by the push-button switches. The spider will remain in this position until the carton or flat has been filled with eggs and until it is pushed off the support thereby actuating the switch 95.

It is sometimes desired that two operators filling cartons or flats of the same grade of eggs will use the same totalizer, and means must be provided to count the eggs of the first carton or flat coming off of the first unit and prevent the counting of the eggs coming off of the second carton or flat until the eggs of the first unit have been completely recorded. This is accomplished, as hereinbefore pointed out, by two relays J. Since this is the only relay of the counting unit which is connected to a second counting unit, these relays only have been illustrated in FIG. 12. For clearness of illustration, however, the commutator plate 34 of the first counter unit is not shown in this figure, but obviously, as shown in FIG. 4, the lead 120 is connected to the common lead 44 of the commutator plate of the counter unit having No. 1 relay J, and lead L2 is connected to the spider 61 of this counter unit. It is obvious that the commutator plate (not shown) of the second counter unit of which No. 2 relay J is a part is connected to this second relay by leads 120′ and L2 of this relay in a manner identical with the connections of relay No. 1. As shown in FIG. 12 connections of the contact 111 of the relay of counting unit No. 1 and the corresponding contacts 111′ of the relay of counting unit No. 2 are connected to suitable plugs and receptacles, so that when units are to be used, the plug of the second unit may be inserted in the receptacle of the first unit. By this arrangement, when the coil 112 of relay No. 1 unit is energized by current coming over lead 144 closed contacts 111 of this relay will be opened, and since these contacts are connected in series with the coil 112′ of the relay of unit No. 2, coil 112′ will be maintained in deenergized condition until the count of unit No. 1 has been completed, at which time the circuit through coil 112 will be broken and normally closed contacts 111 will be reestablished. Current now flowing over lead 144′ of unit No. 2 will cause coil 112′ of relay No. 2 to be energized through closed contacts 111 of the relay of unit No. 1, thereby opening normally closed contacts 111′ of relay No. 2, thus deenergizing coil 112 of unit No. 1 and causing the totalizer to register the number of eggs in the No. 2 unit. The other leads from relay J are shown broken off and are in effect connected to the leads of corresponding numbers in FIG. 4.

I claim:

1. An egg counting device, comprising commutator means having a plurality of spaced annularly arranged stationary contact buttons and contact segment means concentric therewith, an electrically conductive rotatable contact member engaged with said contact segment means and movable over said buttons for intermittent engagement therewith, a common lead for connecting said buttons together, a motor for driving said rotatable contact member, a support for holding an egg container, said contact segment means being of an arcuate length whereby the number of contact buttons engaged by said rotatable contact member, as the rotatable contact member moves from one end of the contact segment means to the other end thereof, corresponds to the number of eggs required to fill a container, a source of electric current for said motor and said rotatable contact member, switch means associated with said support and connecting said motor and said source of electric current for actuating said rotatable contact member to move through an arc less than the length of said contact segment means to sweep over that number of contact buttons corresponding to the number of eggs in a partly filled container, and a push-off switch on said support engageable by an egg container as the same is removed from the support to connect said source to said motor through said contact segment means and said rotatable contact member to cause the rotatable contact member to be rotated the remaining length of said contact segment means and thereby sweep over that number of contact buttons corresponding to the number of eggs required to fill the container, a totalizer, and a common lead connecting said contact buttons with said totalizer for successively recording the number of eggs in both counts.

2. An egg counting device, comprising a commutator plate having a plurality of spaced annularly arranged contact buttons and contact segment means concentric therewith, an electrically conductive rotatable contact member engaged with said contact segment means and movable over said buttons for intermittent engagement therewith, a common lead for connecting said buttons together, a motor for driving said rotatable contact member, a frame for supporting an egg container, said contact segment means being of an arcuate length whereby the number of contact buttons engaged by said rotatable contact member, as the rotatable contact member moves from one end of the contact segment means to the other end thereof, corresponds to the number of eggs required to fill a container, a source of electric current for said motor and said rotatable contact member, switch means associated with said frame and connecting said motor to said source of current for actuating said rotatable contact member to move through an arc less than the length of said contact segment means to sweep over that number of contact buttons corresponding to the number of eggs in a partly filled container, and a push-off switch on said frame engageable by an egg container as the same is removed from the frame to connect said source to said motor through said contact segment means and said rotatable contact member to cause the rotatable contact member to rotate the remaining length of said contact segment means and thereby sweep over that number of contact buttons corresponding to the number of eggs required to fill the container, a totalizer, and a common lead connecting said contact buttons with said totalizer for successively recording the number of eggs in both counts.

3. An egg counting device, comprising of a commutator plate, an annular row of spaced contact buttons carried by said plate, a totalizer, a common lead connecting said totalizer to said buttons, a frame for supporting an egg container, said container having horizontally and vertically arranged rows of egg receptacles, push-button switches carried by said frame and arranged one opposite each horizontal row of egg receptacles with the exception of one row, push-button switches carried by said frame and arranged one opposite each of the vertical rows of egg receptacles with the exception of one row, said plate having an inner annular row of spaced frame segments and an outer annular row of spaced frame segments concentric with said inner row of segments and said row of buttons, an electrically conductive rotatable contact member having integral arms movable over said buttons and the associated segments, a motor for actuating said rotatable contact member, a source of electric current for said motor and said rotatable contact member, leads connecting the vertically arranged push-button switches with said inner row of frame segments, and leads connecting the horizontally arranged push-button switches with the outer row of frame segments, said motor being connected to said source through said rotatable contact member, said push button switches and said inner and outer row of frame segments whereby said motor will be energized to sweep said rotatable contact member over all of said frame segments energized by said push-button switches.

4. An egg counting device, comprising of a commutator plate, an annular row of thirty-six equidistantly spaced contact buttons carried by said plate and arranged in groups of twelve, each group being connected in series with each other and each group having a space between its ends substantially greater than the space between any two live contacts, three container segments arranged on said commutator plate in an annular row concentric with said row of contact buttons and having their ends in spaced relation, jumper wires connecting the adjacent ends of said segments together, a first initially dead-contact member disposed between the spaced ends of the first and third segments, an initially dead-contact member disposed between the adjacent spaced ends of the first and the second and the second and the third container segments, an electrically conductive rotatable contact member having a button arm engaging said row of contact buttons and an integral segment arm engaging the associated segments, a motor for rotating said rotatable contact member, a source of electric current for said motor and said container segments, a push-off switch for successively energizing said first dead-contact member and the succeeding dead-contact members each time said push-off switch is actuated, whereby said button arm will travel over and energize a number of contact buttons corresponding to the length of movement of said segment arm over the energized segments, a totalizer, and a lead connecting the contact buttons with said totalizer for energizing said totalizer to record the number of energized contact buttons.

5. An egg counting device, comprising of a commutator plate, an annular row of thirty-six equidistantly spaced contact buttons carried by said plate and arranged in groups of twelve, the buttons of each group being connected together and each group having a space between its ends substantially greater than the space between any two live contacts, a counter lead connecting each of said live contact buttons, a plurality of container segments arranged in said commutator plate in an annular row concentric with said row of contact buttons and having their ends in spaced relation, jumper wires connecting the adjacent ends of said segments together, an initially dead-contact member disposed between each of the spaced ends of said container segments, an electrically conductive rotatable contact member having a button arm engaging said row of contact buttons and in integral segment arm engaging said segments, a motor for rotating said rotatable contact member, a source of electric current connected at one side thereof in series to said motor and said rotatable contact member and connected at its other side to said segments, a push-off switch connected to the other side of said source and to said dead-contact members to energize the same each time said push-off switch is actuated, whereby said rotatable contact member will travel over into engagement with one of said segments and energize a number of contact buttons corresponding to the length of movement of said segment arm over the energized segment, a totalizer, and a lead for connecting the contact buttons with said totalizer for energizing said totalizer to record the number of energized contact buttons.

6. An egg counting device, comprising of a commutator plate, an annular row of thirty-six equidistantly spaced contact buttons carried by said plate and arranged in groups of twelve, the buttons of each group being connected together and each group having a space between its ends substantially greater than the space between any two live contacts, three container segments arranged on said commutator plate in an annular row concentric with said row of contact buttons and having their ends in spaced relation, jumper wires connecting the adjacent ends of said segments together, a frame for supporting an egg container, a series of push-button switches carried by said frame and arranged one opposite each of the horizontal rows of the egg receptacles of said container with the exception of the one row, a series of push-button switches carried by said frame and arranged one opposite each of the vertical rows of egg receptacles with the exception of one row, said commutator plate having an inner annular row of spaced frame segments and an outer annular row of spaced frame segments concentric with said inner row of segments and with said row of buttons, a rotatable contact member having a button arm, a container segment arm, an inner frame segment arm and an outer frame segment arm, said arms being movable over the associated buttons and segments, a motor for actuating said rotatable contact member, a source of electric current connected at one side thereof in series to said motor and said rotatable contact member and at its other side to said push-button switches, leads connecting the vertically arranged push-button switches with said inner row of frame segments, leads connecting the horizontally arranged push-button switches with the outer row of frame segments to selectively energize said segments and cause said rotatable contact member to sweep over a number of contact buttons corresponding to the number of eggs in a partly filled container, a push-off switch connected to said other side of the source and to said container segments for energizing said motor through said container arm and cause said container segment arm to sweep over said container segments whereby said button contact arm will travel over and energize the number of contact buttons required to fill the receptacle, a totalizer, and a lead connecting the contact buttons with said totalizer for energizing said totalizer to record the number of energized contact buttons.

7. An egg counting device comprising a commutator plate, an annular row of spaced contact buttons carried by said plate, a totalizer, a lead connecting said totalizer with said buttons, a frame for supporting an egg container, said container having horizontally and vertically rows of egg receptacles, push-button switches carried by said frame and arranged one opposite each horizontal row except one row of the egg receptacles of said container; push-button switches carried by said frame and arranged one opposite each of the vertical rows of egg receptacles with the exception of one row, said commutator plate having an inner annular row of spaced frame segments and an outer annular row of spaced frame segments concentric with said inner row of segments and with said row of buttons, an electrically conductive rotatable contact member having integral arms movable respectively over said buttons and said segments, a motor for actuating said rotatable contact member, a source of electric current connected at one side in series to said motor and the rotatable contact member and at its other side to said push-button switches, leads connecting the vertically arranged push-button switch with said outer row of frame contacts, leads connecting the horizontally arranged push-button switches with the inner row of frame segments, and relay means for deenergizing said motor after the rotatable contact member arm has passed over all energized frame segments of said outer row.

8. An egg counting device, comprising a commutator plate, an annular row of thirty-six equidistantly spaced contact buttons carried by said plate and arranged in groups of twelve, the buttons of each group being connected together and each group having a space between its ends substantially greater than the space between any two live contacts, three container segments arranged on said commutator plate in an annular row concentric with said row of contact buttons and having their ends in spaced relation, jumper wires connecting the adjacent ends of said segments together, a first initially dead-contact member between the first and the third container segments, a dead-contact member disposed between the adjacent ends of the first and the second and the second and the third container segments, an electrically conductive rotatable contact member having a button arm engaging said row of contact buttons and an integral segment arm engaging said container segments, a motor for rotating said rotatable contact member, a source of electric current connected at one side in series to said motor and said rotatable contact member, a push-off switch connected to the other side of said source and to said dead-contact members and said segments actuated by movement of a filled egg container for successively energizing the dead-contact members and the associated container segments each time said push-off switch is actuated, whereby said button arm will travel over and energize a number of contact buttons corresponding to the length of movement of said segment arm over the energized segments, relay means for holding the motor circuit closed during the recording of a predetermined number of eggs, a totalizer, and a lead connecting the contact buttons with said totalizer for energizing said totalizer to record the number of energized contact buttons.

9. An egg counting device, comprising a commutator plate, an annular row of thirty-six equidistantly spaced contact buttons arranged in groups of twelve, the buttons of each group being connected together and each group having a space between its ends substantially greater than the space between any two live contacts, three container segments arranged on said commutator plate in an annular row concentric with said row of contact buttons and having their ends in spaced relation, jumper wires connecting the adjacent ends of said segments together, a first initially dead-contact member between the first and the third container segments, an initially dead-contact member between the adjacent ends of the first and the second and the second and the third container segments, an electrically conductive rotatable contact member having a button arm engaging said row of buttons and an integral segment arm engaging said container segments, a motor for rotating said rotatable contact member, a source of electric current connected at one side in series to said motor and said rotating contact member, a push-off switch connected to the other side of said source and to said dead-contact members and said segments actuated by movement of a filled egg container for successively energizing the dead-contact members and the associated container segments each time said push-off switch is actuated, whereby said button arm will travel over the energize a number of contact buttons corresponding to the length of movement of said segment arm over the energized segments, relay means associated with said push-off switch for delaying the passage of current therethrough, a totalizer, and a lead connecting the contact button with said totalizer for energizing said totalizer to record the number of energized contact buttons.

10. An egg counting device, comprising of a commutator plate, an annular row of equidistantly spaced contact buttons carried by said plate and arranged in groups, the buttons of each group being connected together and each group having a space between its ends substantially greater than the space between any two live contacts, a plurality of container segments arranged on said commutator plate in an annular row concentric with said row of contact buttons and having their ends in spaced relation, jumper wires connecting the adjacent ends of said segments together, an initially dead-contact member disposed in each space between the ends of the container segments, an electrically conductive rotatable contact member having a button arm engaging said row of contact buttons and an integral segment arm engaging said segments, a motor for rotating said rotatable contact member, a source of electric current connected at one side in series to said motor and said rotatable contact member, a push-off switch connected to the other side of said source and to said dead-contact members and said segments for successively energizing said dead-contact members each time said push-off switch is actuated for actuating said motor as said segment arm moves over said segments, whereby a number of contact buttons will be energized corresponding to the length of movement of said segment arm over the energized segments, a totalizer, and a lead connecting the contact buttons with the totalizer to record the number of energized contact buttons.

11. In an egg counting device, the combination of a number of counting units, a single totalizer for said units, each unit comprising a commutator plate, an annular row of equidistantly spaced contact buttons carried by each plate and arranged in groups, each group having a space between its ends substantially greater than the space between any two live contacts, a plurality of container segments arranged on said commutator plate in an outer annular row concentric with said row of contact buttons and having their ends in spaced relation, jumper wires connecting the adjacent ends of said segments together, an initially dead-contact member in each space between the ends of said container segments, an electrically conductive rotatable contact member having a button arm movable over said buttons and an integral segment arm movable over said rows of segments, a motor for actuating said rotatable contact member, a source of electric current connected at one side in series to said motor and the rotatable contact member, a push-off switch connected to the other side of said source and to said dead-contact members and said container segments actuated by the removal of a filled egg container for successively energizing said dead-contact members each time said push-off switch is actuated, whereby said button arm will travel over and energize a number of contact buttons corresponding to the length of movement of said segment arm over the energized container segments, leads connecting the contact buttons of each counting unit with the single totalizer for energizing said totalizer to record the number of energized contact buttons, and a sequence relay for each of said counting units, each relay having an energizing coil, normally closed contacts and normally open contacts, the normally closed contacts of one relay being in series with the coil of the other relay, whereby the coil of one relay will be opened while the first energized counting unit is actuated, and will be closed when the normally closed contacts of the first unit has been closed.

References Cited in the file of this patent

UNITED STATES PATENTS

| | | |
|---|---|---|
| 2,068,719 | Troutman | Jan. 26, 1937 |
| 2,540,751 | Mumma | Feb. 6, 1951 |
| 2,605,967 | Stone | Aug. 5, 1952 |
| 2,742,599 | Schweighofer | Apr. 17, 1956 |
| 2,844,314 | Elliot | July 22, 1958 |

UNITED STATES PATENT OFFICE
CERTIFICATE OF CORRECTION

Patent No. 3,022,004                    February 20, 1962

Walter J. Reading

It is hereby certified that error appears in the above numbered patent requiring correction and that the said Letters Patent should read as corrected below.

Column 6, lines 43 and 44, strike out "since there are only two horizontal rows of eggs only one switch 92 is shown in the vertical leg of the frame", and insert instead -- mutator segment 6, this arm will be moved about to the end of this segment thereby recording six eggs --; column 11, line 42, for "the" read -- and --.

Signed and sealed this 28th day of May 1963.

(SEAL)
Attest:

ERNEST W. SWIDER                    DAVID L. LADD
Attesting Officer                    Commissioner of Patents